(12) United States Patent
McKeown et al.

(10) Patent No.: US 6,647,019 B1
(45) Date of Patent: Nov. 11, 2003

(54) PACKET-SWITCH SYSTEM

(75) Inventors: Nicholas W. McKeown, Stanford, CA (US); Costas Calamvokis, Mountain View, CA (US); Shang-Tse Chuang, Redwood City, CA (US); Steven Lin, Fremont, CA (US); Rolf Muralt, Sunnyvale, CA (US); Balaji Prabhakar, Palo Alto, CA (US); Anders Swahn, Redwood City, CA (US); Gregory Watson, Palo Alto, CA (US)

(73) Assignee: PMC-Sierra, Inc., Burnaby BC (CA)

( * ) Notice: Subject to any disclaimer, the term of this patent is extended or adjusted under 35 U.S.C. 154(b) by 0 days.

(21) Appl. No.: 09/303,765

(22) Filed: Apr. 29, 1999

Related U.S. Application Data

(60) Provisional application No. 60/083,455, filed on Apr. 29, 1998.

(51) Int. Cl.[7] .............................................. H04L 12/56
(52) U.S. Cl. ...................... 370/422; 370/229; 370/395.1
(58) Field of Search .................................. 370/422, 351, 370/352, 389, 395, 229, 230, 231, 360, 365, 370, 372, 332, 333, 334, 335, 465, 468, 442, 347, 428, 412–419; 710/128; 709/233, 249

(56) References Cited

U.S. PATENT DOCUMENTS

| | | | |
|---|---|---|---|
| 5,126,999 A | | 6/1992 | Munter et al. ................. 370/60 |
| 5,504,742 A | | 4/1996 | Kakuma et al. ............ 370/60.1 |
| 5,864,542 A | * | 1/1999 | Gupta et al. .................. 370/257 |
| 5,933,607 A | * | 8/1999 | Tate et al. .................... 370/468 |
| 6,072,772 A | * | 6/2000 | Charny et al. ............... 370/229 |

FOREIGN PATENT DOCUMENTS

| | | | |
|---|---|---|---|
| EP | 0849973 A2 | 6/1998 | ........... H04Q/11/04 |

* cited by examiner

*Primary Examiner*—Dang Ton
(74) *Attorney, Agent, or Firm*—Townsend and Townsend and Crew LLP; Kenneth R. Allen

(57) ABSTRACT

A packet-switch system utilizes a linecard-to-switch (LCS) protocol to integrate linecards with a switch core. Since the linecards include a majority of the buffering of the system and are located physically away from switch core, the size of the switch core can be reduced in size. The LCS protocol is a label-swapping, credit-based, flow-control, which enables the system to operate without requiring such information as the number of port modules available within a switch core or what Qualities of Service (QoS) or multicast flows are available. In addition, the LCS protocol enables the linecards to contain and manage the majority of the buffers in the system, and also to control the data drop policy within the system.

20 Claims, 10 Drawing Sheets

|  |  | Bit 7 | Bit 6 | Bit 5 | Bit 4 | Bit 3 | Bit 2 | Bit 1 | Bit 0 |
|---|---|---|---|---|---|---|---|---|---|
| Byte 0 | Backpressure (Credit) Information | Stop | VLD1 | FC-QID | | | | | |
| Byte 1 | | FC-QID (continued) | | | | | | Credit Count | |
| Byte 2 | | Credit Count (continued) | | | | | VLD2 | OVR | FCER-QID |
| Byte 3 | | FCER-QID (continued) | | | | | | | |
| Byte 4 | | FCER-QID (continued) | | | VLD3 | EOP | MP | Flow Label | |
| Byte 5 | Label Information | Flow Label | | | | | | | |
| Byte 6 | | Flow Label (continued) | | | | | | | |
| Byte 7 | | Parity (CRC-8) | | | | | | | |
| Bytes 8-71 | Data | Cell Data | | | | | | | |

Figure 6

|  |  | Bit 7 | Bit 6 | Bit 5 | Bit 4 | Bit 3 | Bit 2 | Bit 1 | Bit 0 |
|---|---|---|---|---|---|---|---|---|---|
| Byte 0 | Request Field | Reg Valid | Label_1 | | | | | | |
| Byte 1 | | Label_1 (continued) | | | | | | | |
| Byte 2 | | Label_1 (continued) | | | | RSVD | | | |
| Byte 3 | Cell Field | Cell Valid | Seq_Number | | | | | | |
| Byte 4 | | Seq_Number (cont.) | | | | RSVD | | | |
| Byte 5 | Hole Request | HR Valid | HR Priority | | | RSVD | | | |
| Byte 6 | CRC Field | Parity (CRC-16) | | | | | | | |
| Byte 7 | | Parity (CRC-16) (continued) | | | | | | | |
| Bytes 8-71 | Data | Cell Data | | | | | | | |

Figure 7

|  |  | Bit 7 | Bit 6 | Bit 5 | Bit 4 | Bit 3 | Bit 2 | Bit 1 | Bit 0 |
|---|---|---|---|---|---|---|---|---|---|
| Byte 0 | Grant Field | Grant Valid | Label_1 | | | | | | |
| Byte 1 | | Label_1 | | | | | | | |
| Byte 2 | | Label_1 | | | | Seq_Num | | | |
| Byte 3 | | Seq_Number | | | | | Cell Valid | Label_2 | |
| Byte 4 | Cell Field | Label_2 | | | | | | | |
| Byte 5 | | Label_2 | | | | | | | |
| Byte 6 | CRC Field | CRC-16 | | | | | | | |
| Byte 7 | | CRC-16 | | | | | | | |
| Bytes 8-71 | Data | Cell Data | | | | | | | |

Figure 8

PACKET-SWITCH SYSTEM

RELATED APPLICATION

This application claims the benefit under 35 U.S.C. §119 (e) of U.S. Provisional Application Serial No. 60/083,455 entitled "Linecard to Switch Protocol," filed by Costas Calamvokis, et al. on Apr. 29, 1998, which is incorporated by reference in its entirety herein.

BACKGROUND OF THE INVENTION

1. Field of the Invention

The present invention generally relates to the field of telecommunication and data communication systems and more particularly to the field of high speed networking systems.

2. Description of the Background of the Invention

The evolution of telecommunication (telecom) and data communication (datacom) networks has been very rapid. In particular, with telecom and datacom (i.e., network service providers) carriers continually seeking more cost-effective networks to carry greater amounts of data over existing optical fiber systems, these carriers have begun to implement high bandwidth technologies, such as wave division multiplexing (WDM) and Optical Carrier level 48c (OC-48c) (2.48 Gbps), with upwards of forty separate OC-48 channels on each optical fiber. Such telecom and datacom networks rely upon high-performance packet-switches such as large Asynchronous Transfer Mode (ATM) switches, Frame Relay switches and Internet Protocol (IP) routers.

These high-performance, high-availability (carrier-class) packet-switches typically are located in large telecom and datacom switching facilities or central offices and currently include such characteristics as: (i) an aggregate bandwidth of 40+Gbps; (ii) approximately 8–16 linecards operating at OC-48c (2.5 Gbps), which carry frames, packet-over-Synchronous Optical Network (SONET) (POS) or ATM-over-SONET; and (iii) a system availability in excess of 99.999% (i.e. out of service less than 10 minutes per year). Such packet-switches typically perform three basic functions: (i) when a data packet (cell, frame or datagram) arrives at an ingress linecard, the packet-switch decides where to transfer the data packet next (i.e. the next hop towards its destination), (ii) the packet-switch delivers the packet from the ingress linecard to the egress linecard(s) that connects to the next hop and (iii) the egress linecard decides when the data packet should be sent to its next hop (i.e. the waiting data packets could be transmitted in either a first come, first served (FCFS) order or according to a scheduling discipline that guarantees delay bounds through the packet-switch). Although the protocols used by packet-switches, such as ATM switches, Frame Relay switches and IP routers, are quite different from one another, these packet-switches still include two basic components: (1) linecards, which both terminate external lines (i.e. perform physical layer functions such as framing, clock synchronization and signaling) and determine where each data packet is to be sent next; and (2) a switch core, which transfers data packets from an ingress linecard to an egress linecard (or to multiple egress linecards if the data packet is a multicast packet).

Over the years there have been a variety of conventional architectures used for such carrier-class packet-switches. Such conventional packet-switches attempt to maximize parallelism to achieve higher performance in two particular ways. First, components that were once shared, such as centralized CPUs and shared memory, are now commonly incorporated onto each linecard where they typically support the requirements of a single interface. Second, data paths are bit-sliced to allow a stream of data packets to be processed and buffered in parallel by multiple, identical elements.

One such conventional packet-switch is built around a conventional computer architecture, as shown in FIG. 1A: a switch core 120, comprising a shared central (backplane) bus 150 and a central CPU/memory buffers 110, and peripheral linecards 130. Each linecard 130 provides the physical layer framing and interface for external lines. Data packets arriving from an external line are received by an ingress linecard 130a, transferred across the shared bus 150 to the central CPU/buffer module 110, where a forwarding decision is made with regard to which egress linecard 130z the data packet is to be transmitted. While CPU/buffer module 110 awaits for bus 150 and the outgoing line connected to the egress linecard 130z to become free, the data packet is buffered; When the bus 150 and the outgoing line connected to linecard 130z become available, the data packet is transferred across bus 150 to egress linecard 130z. Linecard 130z then transmits the data packet out onto the external line. The main limitation of this conventional architecture is that central CPU/buffer module 110 must process every data packet, thereby limiting the throughput of such a system 100.

This performance limitation prompted an alternative architecture as illustrated in FIG. 1B, where a separate CPU and memory buffer is incorporated into each linecard 160 to allow each linecard 160 to make routing decisions pertaining to egress linecard(s) 160 (e.g. 160z). Such parallelism of multiple processing elements increases the system performance and, by avoiding a central CPU each data packet need only traverse the bus 150 once, thereby reducing the congestion of the shared interconnect. The performance of this alternative architecture, however, is limited by the shared backplane bus 150, which limits only one data packet at a time to traverse the bus 150 between two linecards 160.

A more recent design, as illustrated in FIG. 2, attempts to overcome such an additional performance limitation by replacing the shared bus 150 with a switch core 220. In a switch core-based architecture, multiple linecards 160 are co-located within the same rack assembly 225 as the switch core 220 as well as simultaneously communicate with one another, thereby increasing the total throughput of system 200. A further advantage of this alternative packet-switch 200 is that the electrical connections from each linecard 160 to the switch core 220 can be short, fast, point-to-point links, rather than the previous long shared and relatively slow multi-drop links of the shared bus packet-switch 100.

Typically, however, these conventional carrier-class packet-switches 200 only support a small number (i.e. between 8 and 16) of linecards 160. This limited number of linecards 160 is due in part to packet-switch 200 being used as a central point for the aggregation of the bandwidth of the network. In particular, prior to reaching this aggregation point where the carrier-class packet switch 200 is located, many thousands of low-speed external lines are multiplexed together using access multiplexers and lower-speed packet-switches. To accommodate this aggregation of multiplexed line connections, the packet-switch 200 has to support ever greater aggregate bandwidth per line connection at the central aggregation point.

However, with packet-switch racks 225 within telecom and datacom central offices limited in physical size, packet-switches 200 confront packaging density limitations that limit the maximum number of linecards 160 that packet-switch 200 can include. For example, a typical central office rack size in the United States is dictated by Bellcore Networking Equipment Building Standard (NEBS), which currently is limited to 19" wide. In addition, to ensure adequate room for air-flow for cooling between packet-switch components, such as linecards 160, a spacing of about 1" is needed between each linecard 160 within the packet-switch rack 225. If such components are vertically arranged (the preferred orientation) in the packet-switch racks 225, these practical physical constraints limit the capacity of the carrier-class packet switch 200 to approximately 16 linecards 160 per packet-switch 200.

Unfortunately, even though the number of fibers entering each central office is not necessarily increasing, such technologies as WDM has resulted in each fiber, which is attached to the packet-switch 200, now propagating multiple, independent high speed data packet channels, thereby requiring a larger number of linecards 160 to be included within the packet-switch 200. For example, telecom and datacom networks are increasing the number of separate OC-48c channels, which can be multiplexed on a single fiber, to as many as 40 separate channels. In the future, the number of these multiplexed channels most likely will increase to ever greater numbers as well as ever greater speeds (e.g. 10 Gbps (OC-192) and 40 Gbps (OC-768)), which will only be limited by the current speed limitations of opto-electronic components within switch core 220. Since this increase in the number of channels corresponds to an increase in bandwidth demands, the number of linecards 160, which support these additional channels, also increase by approximately the same factor. For example, as previously discussed, WDM has enabled up to 40 separate OC-48c channels to propagate along a single fiber. In such a conventional packet-switch 200, 40 separate linecards would be needed.

Unfortunately, due to before-mentioned physical constraints imposed upon the size of packet-switches 200, these additional conventional linecards 160 are unable to be incorporated into the packet-switch 200. Additionally, as the need for faster transmission systems increases nearly exponentially, the need for higher bandwidth networks also increases at approximately the same rate. Such a need to significantly replace much of the core hardware of packet-switch 200 will further increase the operating costs and downtime of the network.

What is needed is a flexible packet-switch system that supports an increased number of linecards and a greater aggregate system bandwidth.

SUMMARY OF THE INVENTION

Accordingly, a packet-switch system overcomes the physical packaging limitations associated with conventional packet-switches by allowing linecards to be physically located away from the previously co-located switch core. A label-swapping, credit-based, flow-control, linecard-to-switch (LCS) protocol functionally maintains the integration between the linecards and the switch core to enable the maintaining of a high bandwidth throughput for the network. In particular, the label-swapping aspect of the protocol enables the system to operate without requiring the use of an explicit bitmap to indicate such information as how many port modules are available within the switch core or what Qualities of Service (QoS) or multicast flows are available. The credit-based flow control aspect of the protocol enables the linecard to avoid the dropping of data due to buffer overflow within switch core. In particular, by providing such control over the data drop policy at such linecards, the system is more easily configurable. In addition, this aspect of the protocol enables the vast majority of the buffering in the system to be located within the linecard, thereby minimizing the amount of buffering needed within switch core.

BRIEF DESCRIPTION OF THE DRAWINGS

FIG. 6 illustrates a cell format for the LCS-1 protocol.

FIG. 7 illustrates a request cell format for the LCS-2 protocol.

FIG. 8 illustrates a grant cell format for the LCS-2 protocol.

DETAILED DESCRIPTION OF PREFERRED EMBODIMENTS

Preferred embodiments of the present invention are now described with reference to Figures where like reference numbers indicate identical or functionally similar elements and the left most digit of each reference number corresponds to the Figure in which the reference number is first used.

Figure 1A:
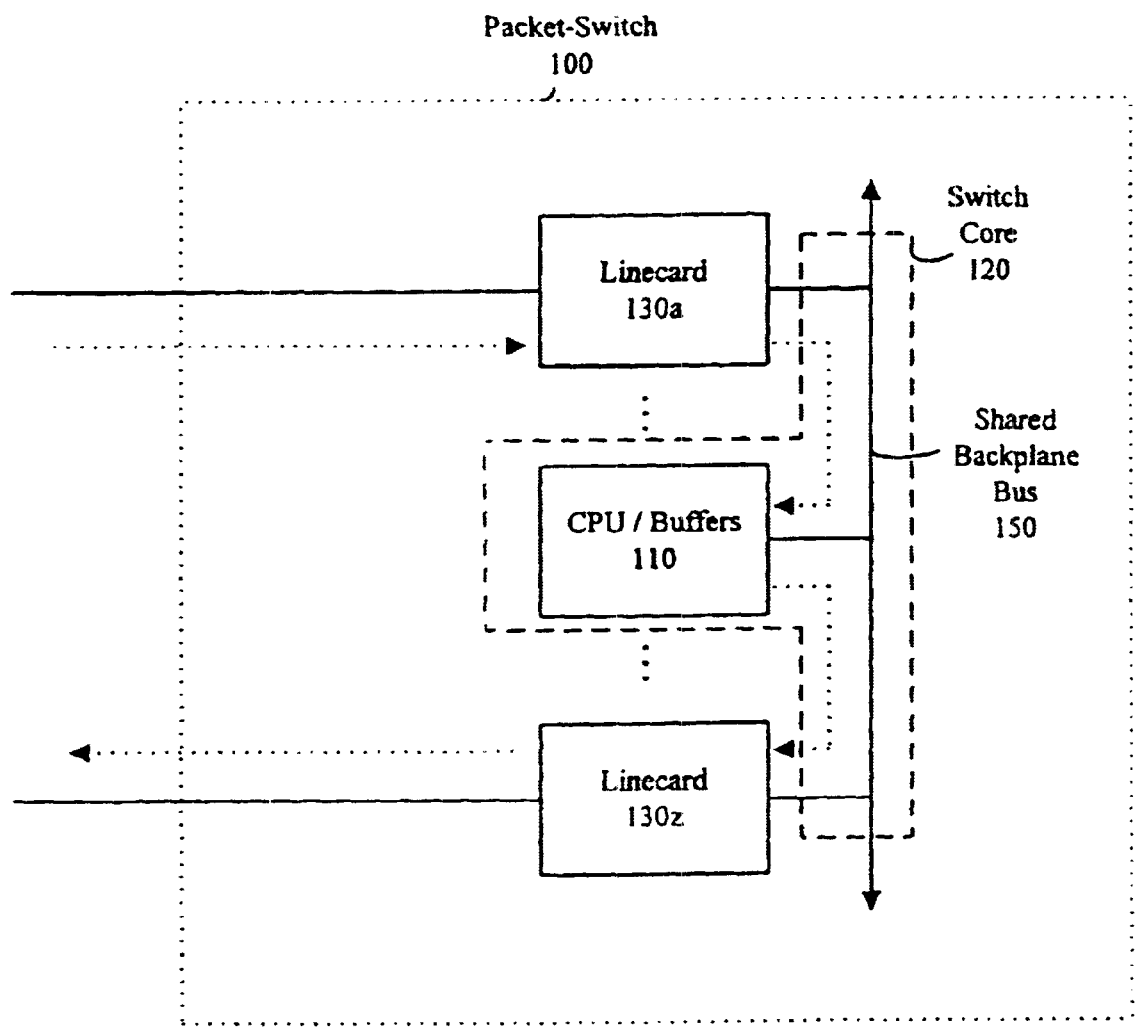
FIG. 1A illustrates a high level overview of a conventional central CPU/buffer packet-switch.
Figure 1B:
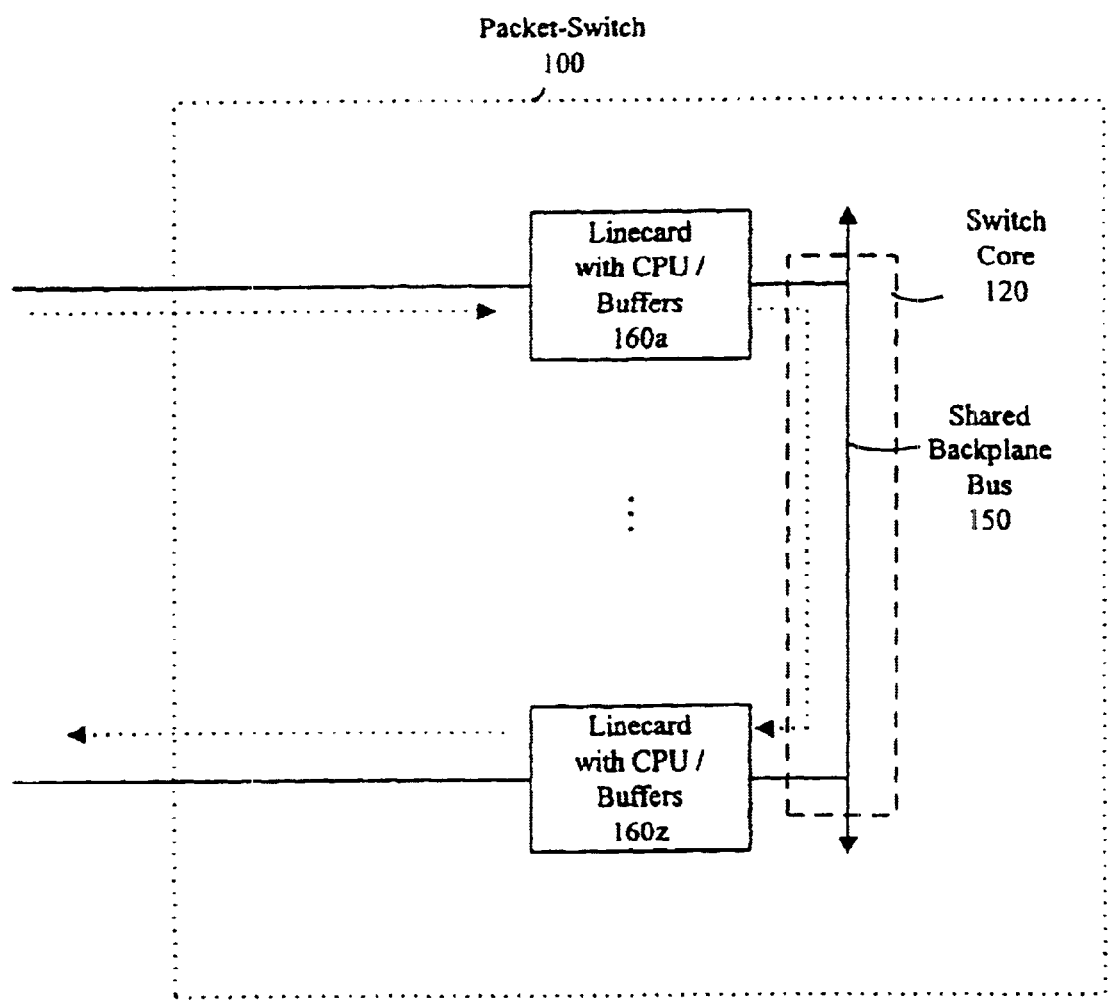
FIG. 1B illustrates a high level overview of a conventional linecard-based packet-switch.
Figure 2:
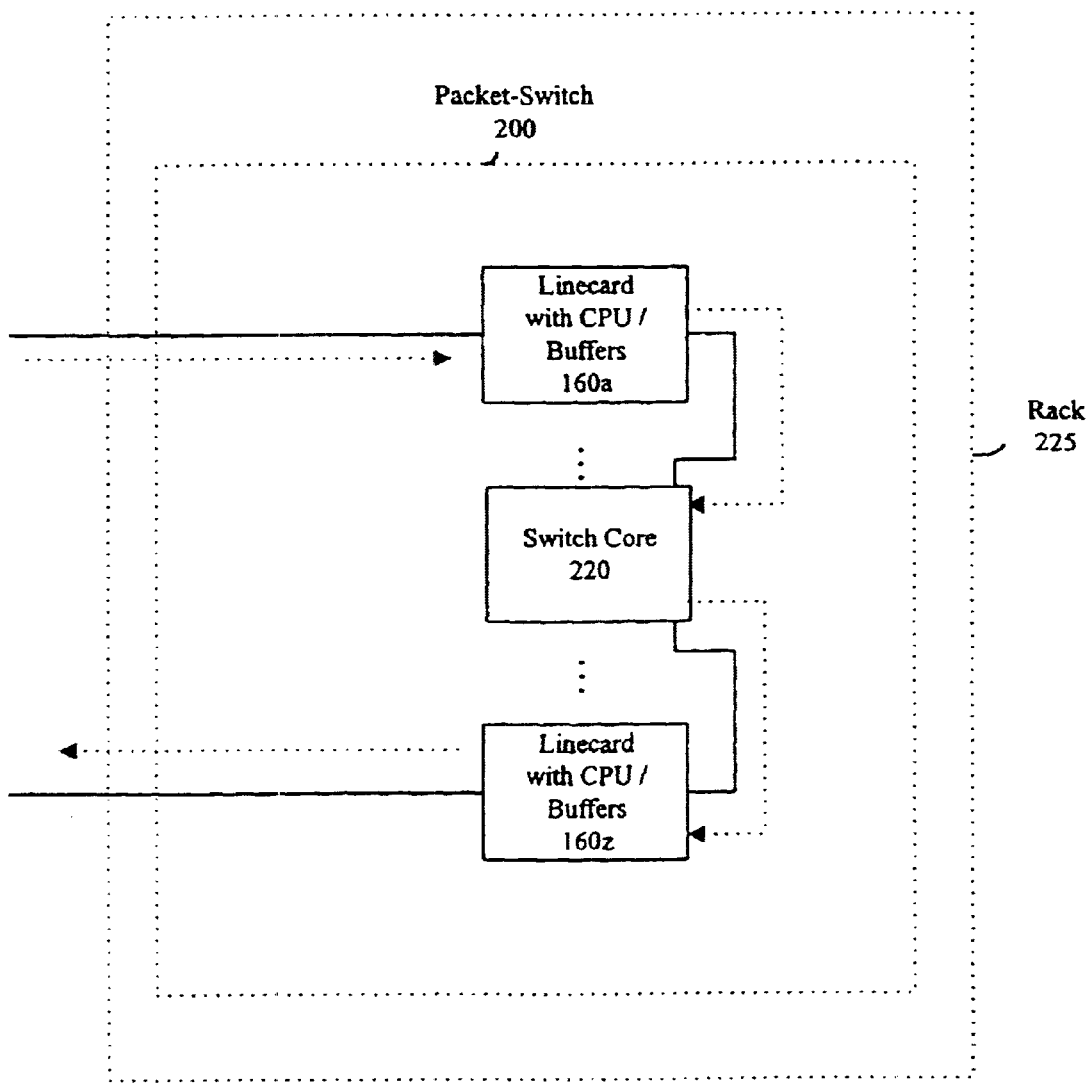
FIG. 2 illustrates a high level overview of a conventional linecard/fabric-based packet-switch.
Figure 3:
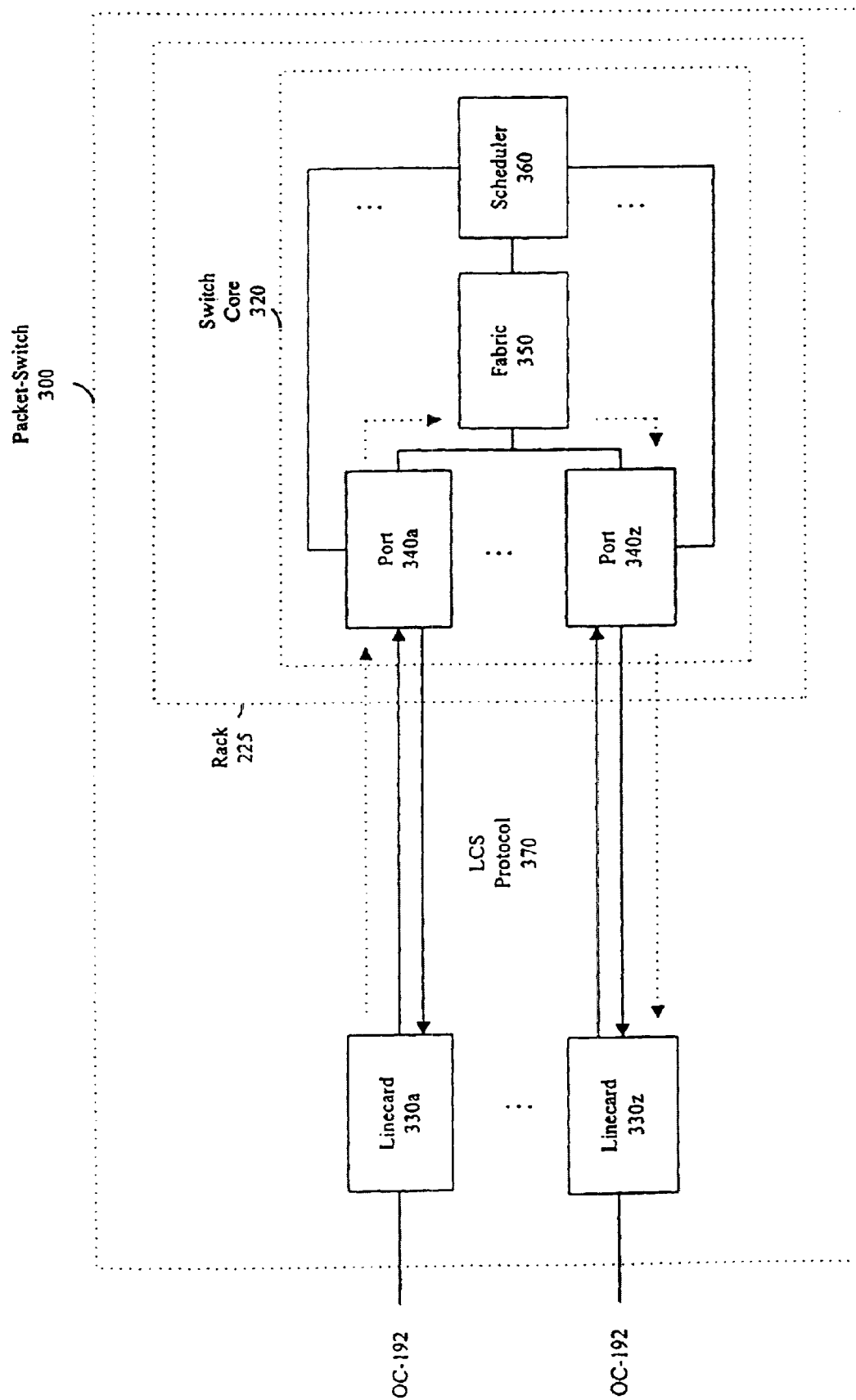
FIG. 3 illustrates a high level overview of a packet-switch system of a preferred embodiment of the present invention.

FIG. 3 illustrates a high level overview of a packet-switch system 300 of a preferred embodiment of the present invention. The packet-switch system 300 includes a switch core 320 and a plurality of linecards 330, which are physically located away from switch core 320. The linecards 330, for example, can by physically located just outside the rack(s) 225, which contain switch core 320. Alternatively, linecards 330 can be physically located (e.g. by several hundred feet) from switch core 320. The switch core 320 includes a plurality of port modules 340, a parallel sliced self-routing crossbar fabric module 350 and a centralized scheduler module 360.

In a preferred embodiment, switch core 320 is located in a single rack 225. However, in an alternative embodiment, a switch core 320 can be located in multiple racks 225.

In a preferred embodiment, each port module 340 is coupled to a separate linecard 330. In addition, each port module 340 includes cell queues that temporarily store data packets (e.g. cells) that are received from or that will be transmitted to linecards 330. The fabric module 350 is coupled between each of these port modules 340 for transferring cells between an ingress port module (e.g. 340a) and an egress port module (e.g. 340z). The determination of the optimal cross-bar configuration for fabric module 350 is determined by scheduler module 360. In an alternative embodiment, wherein greater fault tolerance is used to eliminate the switch core 320 as a potential single point of failure for system 300, port modules 340 can be coupled to either more than one linecard 330, another port module 340 within the same switch core 320 or a port module 340 within a second switch core 320 of a multiple stage packet-switch system. The management of such a fault tolerant configuration is internally performed by each linecard 330. In another alternative embodiment, additional fault tolerance can be provided by the including such functionality within switch core 320.

In a preferred embodiment, such linecards 330 serve as an interface between high speed OC-192 external lines and high speed OC-192 switch core port modules 340. In a first alternative embodiment, linecards 330 alternatively can interface with Fast Ethernet port modules. In a second alternative embodiment, linecards 330 also can interface with OC-3 (155.52 Mbps) port modules.

By physically separating linecards 330 from switch core 320 (e.g. by up to 200 feet), packet-switch system 300 can avoid the conventional mechanical and thermal limitations related to having to co-locate conventional linecards 160 within the same rack 225 as a conventional switch core 220. In addition, the physical separation of linecards 330 away from switch core 320 also enables separate, independent development of linecards 330 and switch cores 320 to occur, thereby avoiding the need to upgrade the system 300 by replacing the entire or a significant portion of system 300. For example, a linecard 330, which is developed today, can connect to a next generation switch core 320, which includes a greater capacity for linecards 330 or new functional features. Furthermore, where linecards 330 and port modules 340 are arranged in a fault tolerant configuration, system 300 can be upgraded without causing system downtime that would interrupt the continuous service of the network.

To maintain functional integration between physically separate linecards 330 and switch cores 320, a linecard-to-switch (LCS) protocol format 370, based upon label-swapping, credit-based, flow-control techniques, is used to exchange cells containing data and header information between linecards 330 and switch core 320. In a preferred embodiment, this LCS protocol 370 operates at a transmission data rate ranging from OC-48 (2.5 Gbps) to OC-768 (40 Gbps). In an alternative embodiment, LCS protocol 370 can operate at transmission rates, which are either smaller or greater than this range.

The label-swapping aspect of LCS protocol 370 enables that system 300 to operate without requiring the use of an explicit bitmap to indicate such information as how many port modules 340 are available within system 300, to which egress linecard 330 (e.g. 330z) a cell is destined, to which cell queue the cell is to be temporarily stored, what type of data is encompassed within the cell (e.g. a fragment of a variable-length Internet Protocol (IP) packet, an Ethernet or Frame-Relay frame or a complete ATM cell) and what Qualities of Service (QoS) or whether multicast flows are available. Hence, LCS protocol 370 can operate with a variety of different generations and types of switch cores 320 (e.g. ATM switches, Frame Relay switches, IP Routers and Gigabit Ethernet systems) without requiring LCS protocol 370 to be modified.

The credit-based flow-control aspect of LCS protocol 370 enables a vast majority of the buffering within system 300, which was conventionally implemented at a location near switch core 320, to now be located at linecards 330 at a location physically away from switch core 320. Linecards 330, therefore, can perform a majority of the processing of cells at a location away from switch core 320, thereby shifting the location of buffering and processing of system 300 away from the co-location within rack 225 as well as also enabling the size of switch core 320 to be smaller than conventional switch cores 120, 220. In addition, linecards 330 within this new paradigm also become responsible for a majority of the administration of system 300 such as managing (1) cell drop policies, (2) the cell queues within system 300 and (3) the Quality of Service (QoS). Such management control assigned to linecards 330 enables developers of these linecards 330 to possess a greater degree of control over the overall functionality of packet-switch system 300.

FIG. 6 illustrates a cell format for a first preferred embodiment of an LCS (LCS-1) protocol 370, wherein symmetrical per-queue flow control is used between linecards 330 and port modules 340. In particular, such an LCS-1 cell includes a header (e.g. 8 bytes in length) and a data portion (e.g. 64 byte in length). The header includes a backpressure (credit) information portion and a label information portion. The credit information portion, which provides linecards 330 with information regarding the currently available space (credits) within the port module 340, which that is coupled to that linecard 330, includes a Stop bit, a first Validation (VLD1) field, a Flow Control Queue Indentifier (FC-QID) field, a Credit Count field, a second Validation (VLD2) field, an Overflow (OVR) field and a Flow-Control Error Recovery (FCER-QID) field.

The Stop bit is a flow control bit, which controls whether any LCS-1 cells are to be transmitted between linecard 330 and the corresponding port module 340. In particular, the Stop bit enables linecard 330 to perform system managerial functions, such as fault isolation detection and self-testing, on system 300 in order to determine when the flow of LCS-1 cells between a linecard 330 and its corresponding port module 340 should be temporarily halted without losing data. The VLD1 field identifies whether there is relevant information contained within the FC-QID field and the Credit Count field for linecard 330 to process. The FC-QID field represents an identifier, which associates the subsequent information within the Credit Count field with a specific cell queue of port module 340. In a preferred embodiment, the FC-QID field is 12 bits in length, thereby allowing a switch core 320 to include up to 4,096 port modules 340. The credit information in the Credit Count indicate the "current" buffer capacity (credit) in the corresponding FC-QID. As will be discussed in more detail in FIGS. 4A and 4B, the Credit Count represents the number of credits in a cell queue of port module 340 at the time the LCS-1 cell containing the Credit Count was transmitted from port module 340. Such a slight delay in such a high speed packet-switch system 300 results in the need for the round trip time (RTT) for an LCS-1 cell to be taken into consideration with regard to the storage capacity of the cell queues. RTT generally corresponds to the sum total of the propagation delay of transmitting an LCS-1 cell from linecard 330 to port module 340, the processing time for port module 340 to respond to the LCS-1 cell, the propagation delay of transmitting an LCS-1 cell from port module 340 to linecard 330 and the processing time for linecard 330 to analyze the LCS-1 cell. The method of determining an adequate capacity for cell queues will be discussed in more detail below.

The VLD2 field identifies to linecards 330 whether there is valid data within the OVR field, the FCER-QID field and the Parity field for linecards 330 to process. The OVR field is an identifier for whether the cell queue of port module 340, which is associated with FCER-QID, is either entirely empty or full. The FCER-QID assists in the recovery from bit- or burst-errors that may have corrupted one or more cell headers. In an alternative embodiment, a second FCER-QID field can be included in the LCS-1 cell to accelerate the recovery of system 300 from such bit-errors.

The label information portion, which designates the characteristic of an LCS-1 cell, such as the intended egress linecard 330 for the LCS-1 cell as well as whether the LCS-1 cell represents best effort traffic, high priority traffic, multicast traffic, unicast traffic or a constant bit rate (CBR), includes a third Validation (VLD3) field, an End Of Packet (EOP) field, a Magic Packet (MP) field, a Flow Label field and a Parity field. The VLD3 field represents whether there is any valid label information within the LCS-1 cell. The EOP field represents an identifier for designating an LCS-1 cell as the last cell in a given data packet flow. For example, if an ATM cell is converted into an LCS-1 cell, each LCS-1 cell represents an entire ATM cell flow, thereby requiring the EOP field of each LCS-1 cell to be in a "1" logic state. However, if an Internet Protocol (IP) packet is converted into LCS-1 cells (e.g. 8 LCS-1 cells in length), each LCS-1 cell would represent a fraction of the entire IP data packet, thereby resulting in the $8^{th}$ LCS-1 cell of the associated IP data packet including an EOP field in the "1" logic state.

The MP bit identifies whether the LCS-1 cell is a standard cell containing data that requires routing from an ingress linecard (e.g. 330a) to an egress linecard (e.g. 330z) or an LCS-1 cell that can modify some aspect of switch core 320. For example, if the MP bit of the header is set by a linecard 330a to a "1" logic state, the entire LCS-1 cell is treated by port module 340a as a special in-band control cell that can modify the configuration of port module 340a or switch core 320 as a whole. In addition, linecard 330a can utilize in-band control cells to provide a mechanism for synchronizing the scheduling to a system-wide stratum 1, 2 or 3 clock. Additional fields within the LCS-1 control cells can be defined to conform to any type of switch core 320 that is used within system 300.

The Flow Label identifies the egress linecard(s) (e.g. 330z) to which the LCS-1 cell is to be transferred. In particular, in a unicast LCS-1 cell, the Flow Label identifies a cell queue within the ingress port module (e.g. 330a) that corresponds to a specific egress port module (e.g. 340z) and its corresponding egress linecard (e.g. 330z) to which the LCS-1 cell is to be transferred. In a multicast LCS-1 cell, the Flow Label identifies a separate multicast cell queue within ingress port module 330a and provides a multicast identifier for designating multiple egress port modules 340 and their corresponding egress linecards 330 to which the LCS-1 cell is to be transferred. In a preferred embodiment, the Flow Label is 18 bits in length with 12 of these bits representing a cell queue within an ingress port module 340. The reason for using a Flow Label, rather than an explicit bitmap that explicitly indicates the egress port module 340 (and indirectly the egress linecard) to which the LCS-1 cell is intended to be transferred, is to maintain the independence of the LCS-1 protocol from both the number of port modules 340 within switch core 320 as well as from the classes of QoS that switch core 320 supports. Hence, the LCS-1 protocol can operate with a variety of different generations of switch core 320 having varying numbers of port modules 340 without requiring direct modification of the LCS-1 protocol. The modifications are instead typically made by upgrading the profiles of switch core 320 and linecards 330. The Parity field represents error control information such as a cyclic redundancy check (CRC) to ensure the integrity of the LCS-1 cell information. In a preferred embodiment, LCS-1 utilizes an 8 bit CRC field, which is calculated over the entire 8 byte header.

The data portion of a preferred embodiment of the present invention includes the cell data, which either can be a portion of the data contained within a specific data packet (e.g. an IP data packet) or can encompass an entire data packet (e.g. an ATM cell). In addition, since the LCS-1 protocol is general in order to promote the compatibility between a variety of different variations of packet-switch systems 300, LCS-1 version information is exchanged between linecards 330 and port modules 340 to enable proper operation of potentially different versions of linecards 330 and port module 340 within such systems 300.

Figure 4A:
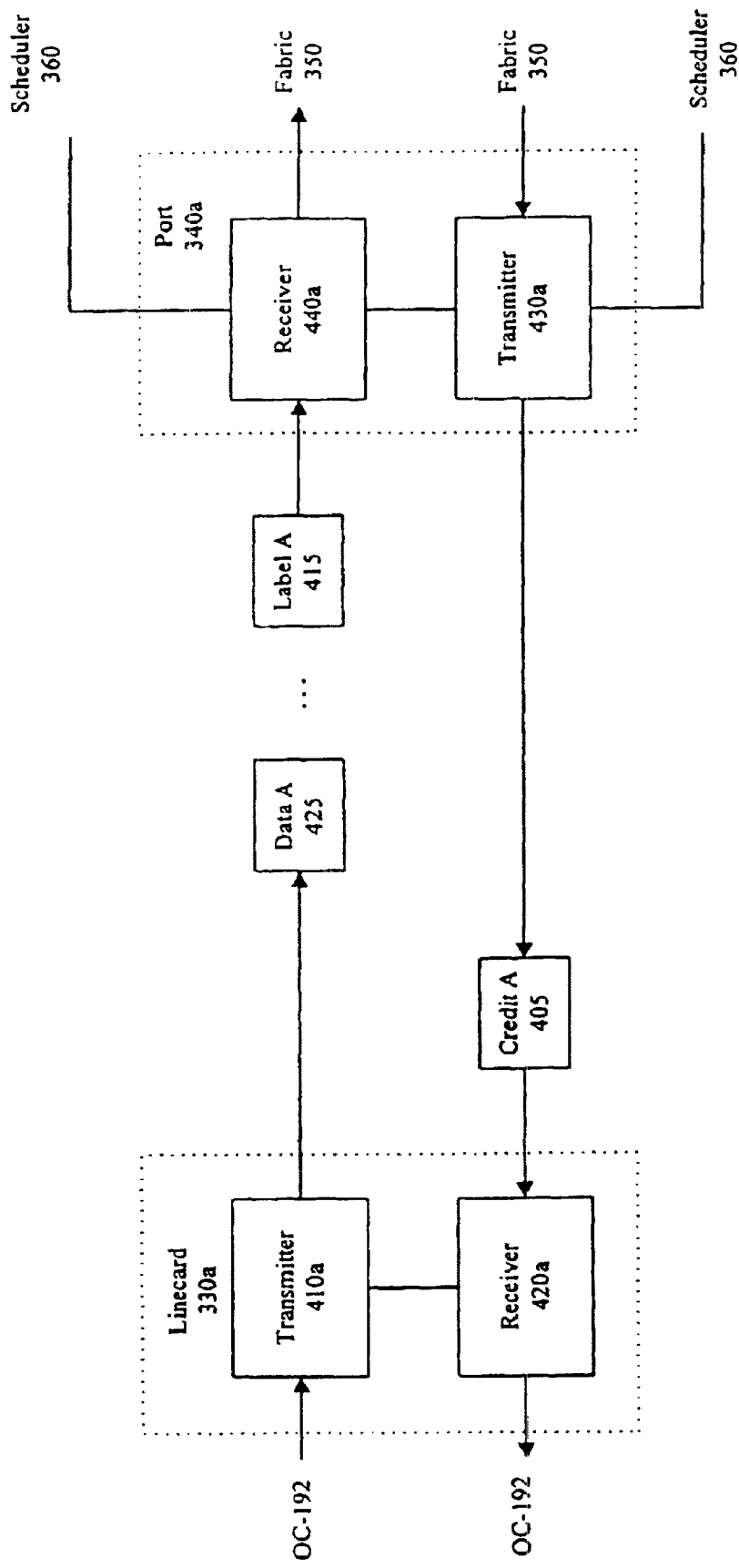
FIG. 4A illustrates an ingress flow of a first preferred embodiment of a linecard-to-switch (LCS-1) protocol communication scheme.
Figure 4B:
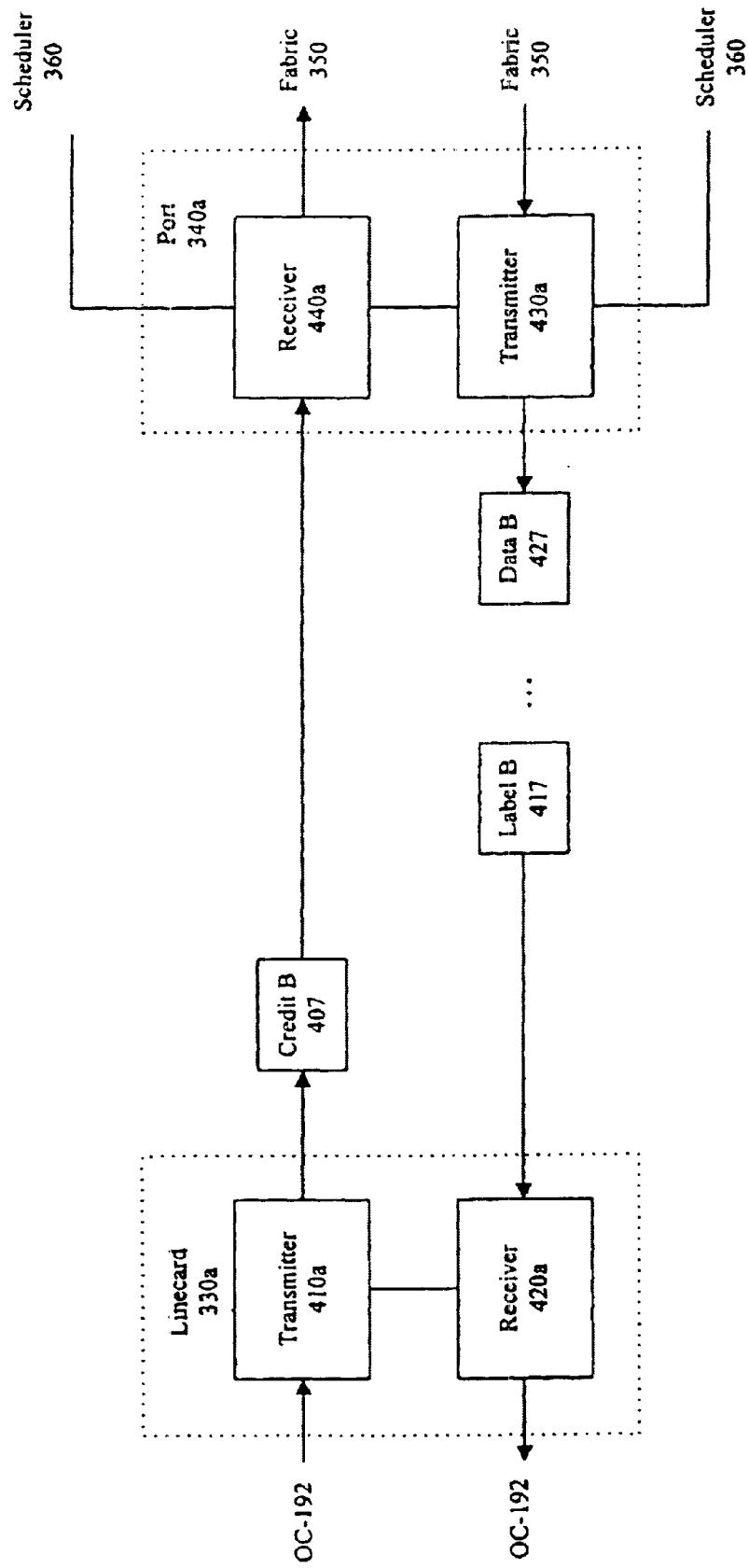
FIG. 4B illustrates an egress flow of a first preferred embodiment of a linecard-to-switch (LCS1) protocol communication scheme.

To illustrate the operation of the first embodiment of LCS protocol 370 (LCS-1) in packet-switch system 300, FIGS. 4A and 4B in conjunction with FIG. 3 will be used to illustrate a high level schematic of the ingress and egress flow of a unicast LCS-1 cell that is transmitted from linecard 330a to port module 340a. It should be noted, however, that the primary focus in this illustrative example to linecard 330a and port module 340a is not intended to limit the scope of a preferred embodiment of the present invention, but rather is intended to avoid unnecessary complexity in describing the flows of one of a plurality of linecard/port module pairs within packet-switch system 300. In a preferred embodiment of system 300, numerous unicast LCS-1 cells (as well as multicast LCS-1 cells) typically are processed in parallel by different linecards 330, which route the LCS-1 cells (via an ingress flow) through switch core 320 to potentially numerous different egress linecards 330 (via an egress flow).

FIG. 4A illustrates a preferred embodiment of linecard 330a, which includes a transmitter module 410a and a receiver module 420a. The port module 340a, which is coupled to linecard 330a, includes a transmitter module 430a and a receiver module 440a. Transmitter module 410a of linecard 330a is coupled to receiver module 420a and between an external OC-192 line and receiver module 440a. Receiver module 420a of linecard 330a also is coupled between an external OC-192 line and transmitter module 430a. Receiver module 440a and transmitter module 430a of port module 340a also are coupled to fabric module 350 and scheduler module 360.

Transmitter module 410a includes credit counters, which are used to maintain a "current" mapping of each of the limited capacity cell queues (not illustrated) within receiver module 440a of port module 340a. Such a mapping ensures that if a credit counter reaches zero, the cell queue, which corresponds to that counter, will not receive any additional LCS-1 cells from transmitter module 410a, which could cause the cell queue to overflow. As will be explained later in more detail, this mapping does not necessarily reflect the true capacity of a cell queue at any specific moment. Rather, the mapping only represents a relatively "current" mapping due to the slight unavoidable time delay between the increase in capacity of a cell queue within receiver module 440a and the updating of the corresponding credit counter within transmitter module 410a. It also should be noted that if cell queues (not illustrated) within receiver module 420a also are of a limited capacity, transmitter module 430a also could maintain a "current" mapping of these cell queues to ensure that the overflow situation also does not occur within receiver module 420a.

Upon receiving data (e.g. an ATM cell) from an external OC-192 line, transmitter module 410a of linecard 330a converts the ATM cell into a fixed length (e.g. 72 byte) unicast LCS-1 cell including a label information portion (e.g. Label A) 415 and a data portion (e.g. Data A) 425. Data A 425 includes the data portion of the ATM cell. Label A 415 includes a Flow Label that indirectly designates the intended egress linecard (e.g. 330z) to which the LCS-1 cell is to be transmitted. In particular, such a designation is represented by associating the identifier within the Flow Label to a specific cell queue of the plurality of cell queues within receiver module 440a, which directly corresponds to egress port module 340z. Since linecard 330z is coupled to port module 340z, by associating the cell queue to egress port module 340z, the cell queue also is associated with linecard 330z.

Prior to transmitting the LCS-1 cell to receiver module 440a, transmitter module 410a analyzes the credit counter value for this cell queue to determine whether the cell queue still has a capacity to receive LCS-1 cells (e.g. a non-zero value). If the credit counter for this cell queue is zero, transmitter module 410a will buffer the LCS-1 cell within linecard 330a and await a credit information portion related to this cell queue (e.g. Credit A) 405 to be received from port module 340a. Receipt of Credit A 405 by linecard 330a will result in the credit counter associated this cell queue to be increment by 1. Credit A 405 includes the VLD1, FC-QID and Credit Count field. The VLD1 field is set to a "1" logic state to alert the linecard 330a that valid credit information is included within Credit A. The FC-QID field is set to an identification number of the cell queue within receiver module 440a that has an increased capacity. The Credit Count field includes the capacity (number of Credits) remaining in this cell queue.

Once the credit counter is in a non-zero state, transmitter module 410a decrements this credit counter by one and transmits an ingress LCS-1 cell, which includes Label A 415 and Data A 425, to receiver module 440a. Upon receiving the ingress LCS-1 cell, receiver module 440a stores Label A 415 and Data A 425 in the cell queue, which was designated by the Flow Label of Label A 415. In an alternative example, if the LCS-1 cell was a multicast cell, the port module 340a would have stored the LCS-1 cell within a separate multicast queue.

When scheduler module 360 determines that the intended egress port module (e.g. 340z) is ready to receive Data A from the cell queue within port module 340a, the scheduler module 360 triggers receiver module 440a to transmit Data A 425 to fabric module 350. Fabric module 350 utilizes the association of the cell queue with egress port module 340z to route unchanged and without loss Data A 425 to egress port module 340z. If the LCS-1 cell was a multicast cell that was stored within the multicast cell queue, the port module 340a would have transmitted Data A 425 from the multicast cell queue within receiver module 440a to fabric module 350. Fabric module 350 then would have forwarded a copy of Data A 425 to each egress port module 340, which was associated with the multicast identifier that was contained within the Flow Label of Label A. Since fabric module 350 does not process Data A 425 with any assumptions as to its content (e.g. whether Data A is either a fragment of a variable-length Internet Protocol (IP) packet, an Ethernet or a Frame-Relay frame or as is the situation in this illustrative example, a complete ATM cell), the LCS-1 protocol can be used in different types of packet switches 300 such as ATM switches, Frame Relay switches, IP Routers and Gigabit Ethernet systems.

When Data A 425 is transmitted from the cell queue of ingress port module 340a, receiver module 440a transmits a credit signal, corresponding to this cell queue, to transmitter module 430a. Transmitter module 430a incorporates this credit signal into a credit information portion (e.g. Credit C) (not illustrated), which is included in the next egress LCS-1 cell (e.g. Label B 417 and Data B 427, which typically have no relationship with Label A 415 and Data A 425) that is to be transmitted to linecard 330a. If as previously discussed, receiver module 420a includes cell queues that are of a limited capacity, transmitter module 430a would maintain credit counters for the cell queues of receiver module 420a and determine whether the specific credit counter value for the intended cell queue is non-zero. If the credit counter for this cell queue is zero, however, transmitter module 430a will buffer the egress LCS-1 cell within port module 340a and await a credit information portion related to this cell queue (e.g. Credit B) 407 from linecard 330a. Upon receipt by transmitter module 430a of Credit B, the credit counter would be increment by 1. Once the relevant credit counter of transmitter module 430a is in a non-zero state, transmitter module 430a decrements this credit counter by one and transmits an egress LCS-1 cell, which includes Credit C 417, Label B 419 and Data B 421, to receiver module 420a.

Upon receiving the egress LCS-1 cell, receiver module 420a stores Label B 417 and Data B 427 in the cell queue, which was designated by the Flow Label of Label B 417. Receiver module 420a also forwards Credit C to transmitter module 410a where the credit counter associated with the credit information contained within Credit C (e.g. the same cell queue that originally stored Label A 415 and Data A 425) is incremented by 1.

Even though the before-mentioned example focuses upon the ingress and egress flow relationship between linecard 330a and port module 340a, the same principles for these flows apply to other linecards 330, which are coupled to other port modules 340. The before-mentioned example is primarily intended to illustrate how the label-swapping, credit based flow control characteristics of LCS-1 protocol operate within a preferred embodiment of the present invention.

To promote an optimal configuration for routing LCS-1 cells in the first embodiment of the LCS-1 protocol, the capacity of the cell queues and an adequate number N of corresponding credits for each cell queue should be properly calculated. To illustrate the relationship between the cell queue capacities and the number N of credits, we will presume that port module 340a includes 33 cell queues, which correspond to the 32 port modules of system 300 as well as a single multicast cell queue, with each cell queue having a capacity to store a certain number N of LCS-1 cells. In addition, for simplicity we will focus upon a single queue within receiver module 340a and presume that no delays due to congestion within fabric module 350 occur.

As previously mentioned, in a preferred embodiment of the present invention, which utilizes the first embodiment of LCS-1 protocol, a fixed number N of credits is associated with each cell queue within port module 340a. While transmitter module 410a transmits ingress LCS-1 cells to receiver module 440a, receiver module 440a also is transmitting egress LCS-1 cell credit signals that are associated with freed capacity within cell queues of receiver module 440a. To enable the transmitter module 410a of ingress linecard 330a to continuously transmit LCS-1 cells to the cell queue of receiver module 440a of ingress port module 340a without unnecessarily confronting a shortage of credits, the capacity of the cell queues of receiver module 440a are configured to ensure that within a RTT a Credit Count associated with this cell queue will be received by the linecard 330a from ingress port module 340a, which causes the credit counter associated with this cell queue to be incremented by one.

Failure to attain such a configuration would result in time periods elapsing where ingress linecard 330a unnecessarily could not transmit an ingress LCS-1 cell to this cell queue within ingress port module 340a. Such a situation would be an unnecessary waste of bandwidth within the system 300. Therefore, by determining the RTT between ingress linecard 330a and ingress port module 340a, the cell queues within port module 340a are set to a certain size to ensure that a Credit Count will always be received from the port module 340a within RTT. For example, assuming a maximum distance of 200 feet between ingress linecard 330a and ingress port module 340a, a processing time (to process credit and data information) by either the linecard 330a and port module 340a equaling approximately 400 ns and an LCS-1 cell with a cell length of 72 bytes, which is transmitted at 10 Gbps, the maximum RTT which could be supported by the system 300, is approximately 64 cell times (where one cell time is equal to the time for an LCS cell to be transmitted (length of an LCS cell divided by the data transmission rate). The cell queues of port module 340a, therefore, would require a capacity of 64 LCS-1 cells FIGS. 7 and 8 illustrate a second preferred embodiment of an LCS (LCS-2) protocol cell format, wherein the communication scheme is an asymmetric protocol that provides a credit-based flow control mechanism for information flowing from ingress linecard (e.g. 330a) to ingress port module (e.g. 340a). Since unlike the LCS-1 protocol, the LCS-2 protocol relies upon credit-based flow control only from the ingress linecard 330a to the ingress port module, the LCS-2 protocol operates under the presumption that the majority of the system buffering occurs at the linecards and that credit-based flow-control is not needed within the egress flow from a port module (e.g. 340a) to a linecard (e.g. 330a).

The LCS-2 protocol utilizes three Phases to transmit an LCS-2 cell from linecard 330 to port module 340: a Request Phase, a Grant Phase and a Transmit Phase. When linecard 330a has received data that requires routing to an egress linecard (e.g. 330z), linecard 330a relies upon the Request Phase to alert port module 340a that data is pending at linecard 330a. When ingress port module 340a is ready to receive this data, port module 340a relies upon the Grant Phase to inform linecard 330a that the port module 340a is ready to receive cell data. Upon receiving such readiness information from port module 340a, linecard 330a relies upon the Transmit Phase to transmit cell data to port module 340a. Although this transmission scheme may increase the latency of system 300, this scheme greatly reduces the buffering requirements of port module 340 without reducing the bandwidth throughput of system 300.

The LCS-2 protocol includes two different LCS-2 cell formats, an LCS-2 request cell and an LCS-2 grant cell. FIG. 8 illustrates a preferred embodiment of the LCS-2 request cell, which is transmitted during the Request Phase from linecard 330 to port module 340. The LCS-2 request cell includes a header and a data portion. The header includes five field groupings: a Request field, a Cell field, a Hole Request field, and a CRC field. The Request field includes a Request (Req) Valid bit, a Label_1 field and a Reserved (Rsvd) field. The Request Valid field indicates to ingress linecard 330a whether the Label_1 field is valid. The Label_1 field represents a Label that is being requested by ingress linecard 330a. The Rsvd field is a field that is reserved for. future functionality for packet-switch system 300. The Cell field includes a Cell Valid bit, a Sequence Number (Seq_Num) field and a Rsvd field. The Cell Valid bit indicates whether the Cell Data field includes a valid LCS-2 cell. The Seq_Num field represents a sequence number for synchronizing the grants with LCS-2 cells. The Rsvd field is a field reserved for future functionality. The Hole Request field includes a Hole Request (HR) Valid bit, an HR Priority field and a Rsvd field. The HR Valid bit indicates a request for a "hole" in the stream from port module 340a to linecard 330a. The HR Priority field identifies the priority of the requested hole. The CRC field includes a CRC calculated over the complete header. The data portion of the LCS-2 cell includes Cell Data that is to be transported through packet-switch system 300. In a preferred embodiment, the Label_1 field is 18 bits in length, the Seq_Num field is 10 bits in length, the and the HR Priority field is 2 bits in length. In addition, the CRC field is 16 bits in length and is calculated over the complete header, which is 64 bits in length.

FIG. 8 illustrates an LCS-2 grant cell, which is transmitted from port module 340a to linecard 330a, also includes a header and a data portion. The header includes three field groups: a Grant field, a Cell field and a CRC field. The Grant field includes a Grant Valid bit, a Label_1 field and a Sequence Number (Seq_Num) field. The Grant Valid field indicates that the Grant field of the LCS-2 cell includes valid Label_1 and Seq_Num information. The Label_1 field is a label for credit information, such as the cell type, a QID, a multicast label or a CBR label. The Seq_Num field represents a sequence number that is associated with the grant. The cell portion of the LCS-2 cell includes a Cell Valid field and a Label_2 field. The Cell Valid field indicates to linecard 330 whether the cell portion of the LCS-2 grant cell includes valid Label_2 and Cell Data. The Label_2 field represents a label for the LCS-2 grant cell, which includes such information as the cell-type and an identifier for port module 340a. The CRC portion of the LCS-2 grant cell includes a CRC field, which is calculated over the entire header of the LCS-2 grant cell. The data portion includes cell data. In a preferred embodiment, the Label_1 field is 18 bits in length, the Seq_Num field is 10 bits in length, the Label_2 field is 18 bits in length, the CRC field is 16 bits in length and the Cell Data field is 64 bits in length.

In an alternative embodiment, the Label_1 field in both the LCS-2 request cell and the LCS-2 grant cell also can represent such information as the cell type as well as either the unicast QID, the multicast label or the CBR label. In particular, the last 4 bits in the Label_1 field of a preferred embodiment of the present invention can designate the LCS-2 cell as either a Control Packet cell ("0000"), a CBR cell ("0111"), a unicast best-effort cell ("1011") or a multicast best-effort cell ("1111"). In addition, the Label_1 field of a CBR cell also can include a CBR tag for associating the LCS-2 request or grant cell with a specific CBR time slot. The Label_1 field of a unicast best-effort cell can include a priority level between 0 and 3 and an identifier, which identifies the egress linecard (e.g. 330z). The multicast best-effort Label_1 field can include a priority level between 0 and 3 and a multicast tag. The multicast tag is used by the fabric 350 to forward the LCS-2 cell to the corresponding egress port modules 340 to which the cell data is intended be transmitted. In another alternative embodiment, the Label_2 field of the LCS-2 grant cell can be used to identify the cell type as well as CBR, unicast and multicast information. In addition, in an alternative embodiment where port module 340a is set to be in an "OC-48 mode", a two bit ("MUX[1:0]") field can be placed at the beginning of the Label_1 or Label_2 field in order to multiplex/demultiplex each of four OC-48 channels. For LCS-2 request cells, the MUX[1:0] bits are carried in the Request Label field. For LCS-2 grant cells, the MUX[1:0] bits are carried in the Grant Label (not the Cell Label). In particular, when LCS-2 request cells are received by port module 340*a*, the MUX[1:0] field follows the sequence "00," "01," "10," "11", "00," . . . in consecutive LCS-2 request cells. When the LCS-2 grant cells are transmitted by port module 340*a* to linecard 330*a*, the MUX[1:0] field follows the sequence "00," "01," "10," "11", "00," . . . in consecutive LCS-2 grant cells.

Figure 5:
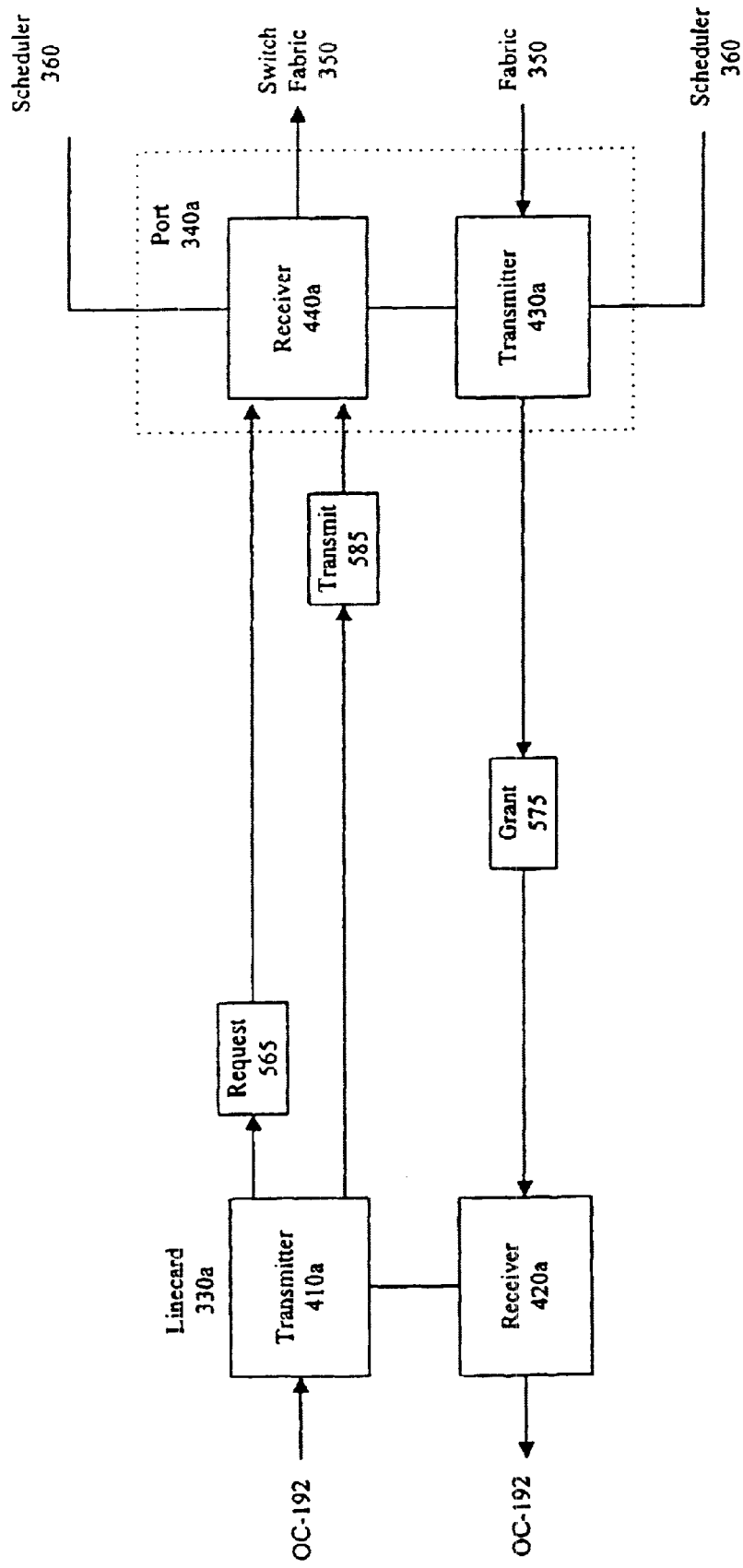
FIG. 5 illustrates a second preferred embodiment of a linecard-to-switch (LCS-2) protocol communication scheme.

To illustrate the LCS-2 protocol scheme in packet-switch system 300, FIG. 5 illustrates a high level schematic of the Request Phase, Grant Phase and Transmit Phase, which results in the transmission of a unicast LCS-2 data cell (an LCS-2 request cell, which contains cell data that is the focus of this illustrative example within the Cell Data field), from ingress linecard 330*a* to port module 340*a*. The Request Phase is initiated when linecard 330*a* transmits an LCS-2 request cell, which identifies that linceard 330*a* is ready to transmit cell data to port module 340*a*. The Label_1 field within this LCS-2 request cell identifies to which flow the requested LCS-2 request cell belongs. The Cell Data field, which is included within this LCS-2 request cell, does not correspond to the cell data that is currently ready to be transmitted, but rather relates to a previous cell data that has been pending within the linecard 330*a*, which has been granted permission to be transmitted to the port module 340*a*. The cell data, which is ready for transmission and which has triggered this current Request Phase, will be incorporated into a subsequent LCS-2 request cell, which will be later identified as the LCS-2 data cell.

When port module 340*a* receives the LCS-2 request cell, port module 340*a* stores the request (field) until port module 340*a* is ready to receive the cell data from linecard 330*a*. The details of how and when the Grant Phase, corresponding to granting the request of the linecard 330*a*, is initiated is specific to each implementation of packet-switch system 300. In a preferred embodiment, scheduler module 360 examines all requests within each port module 340 of system 300 and selects and triggers the Grant Phase for specific requests that are stored within one of more of these port modules 340. Once port module 340*a* is triggered to initiate the Grant Phase for a specific request, port module 340*a* transmits an LCS-2 grant cell to linecard 330*a* to signal linecard 330*a* that port module 340*a* is ready to receive the cell data corresponding to the request. The Grant field of this LCS-2 grant cell includes the same Label_1 field as the original LCS-2 request cell. When ingress linecard 330*a* receives the LCS-2 grant cell, the Transmit Phase is initiated by linecard 330*a* including the cell data in the next LCS-2 request (data) cell, which is transmitted to port module 340*a*.

Since linecard 330*a* only transmits an LCS-2 data cell to port module 340*a* when port module 340*a* grants the linecard 330*a* permission to transmit the cell data, the amount of buffering required within port module 340*a* is even less than the amount of buffering required in an LCS-1-based system 300. For example, since the primary buffering within a port module 340*a* of an LCS-2-based system 300 is of request information, rather the cell data itself, less buffering is needed to store the smaller amounts of information. Therefore, the size of the switch core 320 of a system 300, which utilizes the LCS-2 protocol, can be further reduced in size.

In such a system 300, linecard 330*a* maintains an up-to-date record of the outstanding requests, to which port module 340*a* has yet to respond with a grant. Similar to the LCS-1 credit-based flow-control scheme, linecard 330*a* relies upon credit-based flow-control between linecard 330*a* and port module 340*a* to track the outstanding LCS-2 request cells. Both linecard 330*a* and port module 340*a* maintain such information with a "request counter" for each cell queue. In a preferred embodiment, such request counters are maintained within transmitter module 410*a* and receiver module 440*a*. Upon initialization of linecard 330*a* and port module 340*a*, all request counters are initialized to contain the number of requests that receiver module 440*a* of port module 340*a* can store. This request counter represents the maximum number of additional LCS-2 requests that receiver module 440*a* can store from linecard 330*a*. When linecard 330*a* transmits an LCS-2 request cell to port module 340*a*, transmitter module 410*a* decrements the request counter by one. When port module 340*a* receives the LCS-2 request cell, receiver module 440*a* decrements the request counter associated with the specific cell queue by one. When port module 340*a* requests transmitter module 410*a* to transmit an LCS-2 grant cell to linecard 330*a*, receiver module 440*a* increments the appropriate request counter by one. When linecard 330*a* receives this LCS-2 grant cell and then responds with an LCS-2 data cell, transmitter module 410*a* increments the request counter for that cell queue by one. As long as the request counter for a specific cell queue is non-zero, linecard 330*a* may continue to issue to port module 340*a* new LCS-2 request cells related to that cell queue.

To prevent the degradation of the throughput of the system 300, the number of requests that receiver module 440*a* can store for each queue should be in excess of the number of LCS-2 request cells that are received in one RTT. RTT is approximately equal to the time that elapses from when transmitter module 410*a* issues an LCS-2 grant cell to when the corresponding cell data is received from linecard 330*a* by receiver module 440*a*. Because the exact RTT is not utilized by port module 340*a*, after port module 340*a* issues an LCS-2 grant cell, port module 340*a* cannot anticipate when port module 340*a* will receive the corresponding LCS-2 data cell. This lack of anticipatory information can be further complicated by errors and the loss of LCS-2 grant cells. To overcome this potential problem, sequence numbers are used in both the LCS-2 request (data) cells and the LCS-2 grants cells to enable port module 340*a* to synchronize received LCS-2 request (data) cells with their corresponding LCS-2 grant cells. Upon receiving this LCS-2 grant cell, linecard 330*a* responds by including the same sequence number within the corresponding LCS-2 data cell, which includes the cell data related to the received LCS-2 grant cell.

When ingress port module 340*a* receives the LCS-2 data cell containing the cell data, ingress port module 340*a* forwards the cell data via fabric module 350 to the appropriate egress port module(s) 340*z*. When egress port module 340*z* receives this cell data, the egress port module 340*z* retransmits the cell data within an LCS-2 grant cell to egress linecard 330*z*. Unlike LCS-1, a preferred embodiment of LCS-2 protocol does not include a symmetric flow-control transmission scheme for the egress flow from port module 340 to linecard 330. An alternative embodiment of LCS-2 protocol, however, could support such an egress flow-control transmission scheme. A preferred embodiment of the present invention instead relies upon a simplified rate-based flow-control mechanism that utilizes "holes". A "hole" is said to occur if, in a single LCS-2 cell time, port module 340*z* does not transmit an LCS-2 grant cell to linecard 330*z*. Egress linecard 330*z* may explicitly request for "holes" in the data-stream between port module 340z and linecard 330z by setting the HR Valid field within an LCS-2 request cell to a "1" logic state and setting the HR priority of the request. The HR priority field notifies port module 340z that within a specific time frame, no LCS-2 grant cells of equal to or less than a specifically defined priority will be transmitted to linecard 330z. In a preferred embodiment, the time between port module 340z receiving a hole request and transmitting a hole can be several hundreds of LCS-2 cell times.

There are a number of different types of errors that can occur in the LCS-2 flow process. To ensure that when bit-errors occur the LCS-2 protocol can quickly recover and continue to transmit LCS-2 cells to the correct destination, an error-control scheme is utilized. In particular, such an error-control scheme ensures that when an LCS-2 request or grant cell is lost, an appropriate response by either linecard 330a or port module 340a can occur to rectify the problem.

With regard to minimizing the effects of an LCS-2 request cell or grant cell becoming dropped, a periodic LCS-2 request (control) cell, containing control packet information, is transmitted by linecard 330a to port module 340a to correct any of these inconsistencies by providing the current value of a certain request counter that is associated with a specific cell queue within port module 340a. Over successive transmissions of LCS-2 control cells, linecard 330a cycles through each of its request counters. The frequency at which LCS-2 control cells are sent is at the discretion of linecard 330a and is typically based upon the expected bit-error rate of the system 300. For example, in a system 300 with a link between linecard 330a and the port module 340a having a Bit Error Rate (BER) of $10^{-15}$, one LCS-2 cell is expected to be in error approximately every $10^{12}$ LCS-2 cells transmitted. If, for example, linecard 330a and port module 340a maintain as many as 1000 request counters, then transmitting an LCS-2 control packet cell every 100,000 LCS-2 cell times should be more than adequate to minimize errors with only a loss of approximately 0.001% of the data rate between linecard 330a and port module 340a. Note, however, that since a time elapses between linecard 330a transmitting the LCS-2 control cells and port module 340a receiving and processing the LCS-2 control packet where port module 340a may have issued a number of new LCS-2 grant cells (e.g. up to 0.5*[RTT]), the request count contained within the Control Packet field (like the Credit Count field within LCS-1) actually is slightly "out of date" when it is utilized by port module 340a. This variation in the request count, however, is bounded, which thereby allows port module 340a to maintain a relatively accurate request count. For example, if the received request count differs from the expected request count by more than the number of in-transit LCS-2 grant cells, then port module 340a can conclude that the state is inconsistent and can rectify it by obtaining updated request count information.

When port module 340a sends an LCS-2 control cell to linecard 330a, port module 340a includes a "0000" identifier within the Label_2 field of the LCS-2 grant cell to alert linecard 330a that this LCS-2 cell is a control cell. The control information related to this LCS-2 control cell is included within the cell data field of the LCS-2 control cell. When linecard 330a sends an LCS-2 control cell to port module 340a, linecard 330a conforms to the three Phases. For example, first linecard 330a transmits an LCS-2 request cell including a control cell identifier of "0000" within the Label_1 field of the cell. When linecard 330a receives an LCS-2 grant cell response from port module 340a, linecard 330a transmits a new LCS-2 request (control) cell, which includes control data within the cell data field. Such LCS-2 control cells may include CBR Synchronization (Sync) Control Cells, Request Counter Update Control Cells, or Magic Packet (MP) Control Cells. As a CBR Sync LCS-2 control cell, either linecard 330a or port module 340a can transmit this cell with synchronization information as well as a means to select the CBR table, which is stored in the port module 340a, between port module 340a and linecard 330a. The Request Counter Update Control Cell can be transmitted by linecard 330a to indicate the current value of the request counter. Upon receiving the Request Counter Update Control Cell, port module 340a could automatically update its request counter to match the information within this received cell. The Magic Packet Control Cells can be used to carry in-band data between linecard 330a and the CPU of switch core 320.

With regard to minimizing the possible desynchronization of an LCS-2 request cell from a corresponding LCS-2 grant cell, a sequence number within the LCS-2 cells can be used. For example, every time port module 340a issues an LCS-2 grant cell, port module 340a attaches a sequence number to that cell. When linecard 330a receives the LCS-2 grant cell, linecard 330a attaches the same sequence number to the LCS-2 data cell, which contains the requested cell data. If an LCS-2 grant or request cell is lost, port module 340a will be able to detect the problem and rectify the problem when the next non-error LCS-2 data cell arrives. In a preferred embodiment, the sequence number is 10 bits in length. In alternative embodiments, a smaller sequence number field can be used. In fact, in an alternative embodiment, one or more bits may suffice to accurately detect whether linecard 330a and port module 340a are synchronized. However, if fewer bits are used within the sequence number field, more LCS-2 cells are lost when a CRC-error occurs.

Similar to LCS-1, the LCS-2 protocol is sufficiently general to enable compatibility with a variety of packet-switch systems 300. Such systems 300 rely upon LCS-2 version information to enable linecards 330 and port modules 340 to properly operate in different environments. In a preferred embodiment similar to the LCS-1 protocol, linecards 330 and port modules 340 can exchange version information to enable linecards 330 and port modules 340 to remain compatible with one another.

The above descriptions are intended to illustrate the operation of preferred embodiments of the present invention and are not meant to limit the scope of the invention. From the above discussion, many variations will be apparent to one skilled in the art that would yet be encompassed by the spirit and scope of the invention. For example, even though a first preferred embodiment (LCS-1) and a second preferred embodiment (LCS-2) of the LCS protocol have been described, additional embodiments of the LCS protocol can be implemented, which serve the same purpose of integrating the linecards 330 with port module 340, which is physically away from the linecard 330. Additionally, the credit-based, flow control scheme of the LCS protocol could be an absolute, rather than an incremental credit-based scheme.

What is claimed is:

1. A method for packet-switching comprising the steps of:

receiving a data signal at a first location, said first location is outside of a switch core;

converting the data signal into at least one cell signal at the first location, wherein the at least one cell signal includes an egress location identifier relating to an egress location within the switch core;

transmitting the at least one cell signal to an ingress location within the switch core, wherein the step of transmitting the at least one cell signal comprises the additional step of exchanging credit-based, flow control information between the first location and the ingress location; and sending a request count value periodically so as to tolerate dropped requests or grant cells.

2. The method of claim 1 further comprising the step of responding to the egress location identifier by routing the at least one cell signal from the ingress location to the egress location within the switch core.

3. The method of claim 1 wherein the at least one cell signal includes a linecard-to-switch protocol format.

4. The method of claim 1 wherein prior to transmitting the at least one cell signal to the ingress location, the method further comprises the step of requesting permission from the switch core to transmit the at least one cell signal from the first location to the ingress location.

5. The method of claim 1 wherein prior to transmitting the at least one cell signal to the switch core, the method further comprises the step of receiving a grant from the switch core to transmit the at least one cell signal from the first location to the ingress location.

6. A packet-switch system comprising:

a port module;

a linecard, coupled to the port module, adapted to exchange cell signals with the port module, said cell signals includes credit-based, flow control information; and a module adapted to send a request count value periodically so as to tolerate dropped requests or grant cells.

7. The system of claim 6 wherein the linecard includes a transmitter module, adapted to monitor the capacity of the port module to receive cell signals, said monitoring relies upon credit-based, flow control information received from the port module.

8. The system of claim 6, wherein the port module includes a transmitter module, adapted to determine the capacity of the linecard to receive cell signals, said determination is based upon credit-based, flow control information received from the linecard.

9. A method for packet switching comprising the steps of:

exchanging credit-based, flow control information between a transmitter module and a receiver module, wherein said credit-based flow control information is included within at least one linecard-to-switch protocol formatted cell signal;

maintaining a mapping of the buffering capacity of the receiver module to receive the at least one linecard-to-switch protocol formatted cell signal; and sending a request count value periodically so as to tolerate dropped requests or grant cells.

10. An apparatus comprising:

a transmitter module, adapted to receive a first signal in a first format and to transmit a second signal in a linecard-to-switch protocol format, a receiver module, coupled to the transmitter module, adapted to receive a third signal in the linecard-to-switch protocol format, to transmit a fourth signal in a third format and to transmit buffering capacity information regarding the receiver module to the transmitter module; and a module adapted to send a request count value periodically so as to tolerate dropped requests or grant cells.

11. The apparatus of claim 10 wherein the first format and the third format include a linecard-to-switch protocol.

12. The apparatus of claim 10 wherein the first format and the third format includes an asynchronous transfer mode cell.

13. The method of claim 1 further comprising:

detecting if there is an error in the request or grant by checking that the request counter value is within a range bounded by the number of cells in transition.

14. The method of claim 13 further comprising:

detecting that a request cell signal or grant cell signal is lost if an associated sequence number does not increment.

15. The packet-switch system of claim 6 further comprising:

a module adapted to detect if there is an error in the request or grant by checking that the request counter value is within a range bounded by the number of cells in transition.

16. The packet-switch system of claim 15 further comprising:

a module adapted to detect that a request cell signal or grant cell signal is lost if an associated sequence number does not increment.

17. The method of claim 9 further comprising:

detecting if there is an error in the request or grant by checking that the request counter value is within a range bounded by the number of cells in transition.

18. The method of claim 17 further comprising:

detecting that a request cell signal or grant cell signal is lost if an associated sequence number does not increment.

19. The apparatus of claim 10 further comprising:

a module adapted to detect if there is an error in the request or grant by checking that the request counter value is within a range bounded by the number of cells in transition.

20. The apparatus of claim 19 further comprising:

a module adapted to detect that a request cell signal or grant cell signal is lost if an associated sequence number does not increment.

* * * * *